United States Patent
Halperin et al.

[19]

[11] Patent Number: 6,105,004
[45] Date of Patent: Aug. 15, 2000

[54] PRODUCT MONITORING SYSTEM PARTICULARLY USEFUL IN MERCHANDISING AND INVENTORY CONTROL

[75] Inventors: Avner Halperin, Tel Aviv; Mordechai Teicher, Kfar Saba, both of Israel

[73] Assignee: Eldat Communication, Ltd., Bnei Brak, Israel

[21] Appl. No.: 08/839,838

[22] Filed: Apr. 17, 1997

[51] Int. Cl.[7] .................................................. G06F 17/60
[52] U.S. Cl. ............................... 705/28; 235/383; 705/22
[58] Field of Search ................................... 705/28, 1, 16, 705/20, 21, 22, 23, 29; 235/383

[56] References Cited

U.S. PATENT DOCUMENTS

| | | | |
|---|---|---|---|
| 5,111,196 | 5/1992 | Hunt | 340/825.35 |
| 5,216,233 | 6/1993 | Main et al. | 235/472 |
| 5,241,467 | 8/1993 | Failing et al. | 364/401 |
| 5,382,779 | 1/1995 | Gupta | 235/383 |
| 5,394,159 | 2/1995 | Schneider et al. | 343/700 |
| 5,448,226 | 9/1995 | Failing, Jr. et al. | 340/825.35 |
| 5,461,561 | 10/1995 | Ackerman et al. | 364/401 |
| 5,473,146 | 12/1995 | Goodwin, III | 235/383 |
| 5,583,487 | 12/1996 | Ackerman et al. | 340/825.35 |
| 5,704,049 | 12/1997 | Briechle | 395/326 |
| 5,794,211 | 8/1998 | Goodwin, III et al. | 705/23 |
| 5,812,985 | 9/1998 | Failing et al. | 705/5 |
| 5,880,449 | 3/1999 | Teicher et al. | 235/383 |
| 5,918,211 | 6/1999 | Sloane | 705/16 |
| 5,933,813 | 8/1999 | Teicher et al. | 705/26 |
| 5,940,808 | 8/1999 | Joseph | 705/28 |
| 6,016,481 | 1/2000 | Failing, Jr. et al. | 705/28 |

OTHER PUBLICATIONS

Garry, Michael, "Riding the Air Waves," Progressive Grocer, vol. 73, No. 7. pp. 104–106, Jul. 1994.
Murray, Maureen, "Supermarkets Getting Wired for the Future Industry Gets Set for Explosion of Technology," Toronto Star, Final ED, p. 1, May 1994.
Anonymous, "Information Unplugged," Chain Store Age, pp. 15B–17B, Sep. 1996.
"NCR Wins Store Automation Contract for Military Commissaries Worldwide," PR Newswire, p. 0221CLW014, Feb. 1996.
Garry, Michael, "Is Your Scanning Accurate?," Progressive Grocer, vol. 74, No. 8, pp. 55–57, Aug. 1995.
Shulman, Richard, "Thinking Ahead," Supermarket Business, vol. 50, No. 2, p. 45(3), Feb. 1995.

*Primary Examiner*—Tod R. Swann
*Assistant Examiner*—Susanna Meinecke-Diaz
*Attorney, Agent, or Firm*—McDermott, Will & Emery

[57] ABSTRACT

A product monitoring system for monitoring a variety of products grouped according to their identities on shelves, includes a central computer storing the identification of each group of products on the shelves; a plurality of electronic shelf labels, each located adjacent to a shelf for a group of products, communicating with the central computer, storing the identification of the respective group of products, displaying information relating to the respective group of products, and reading out the identification of the respective group of products; a plurality of portable units each to be carried by a user of the system; and a record memory for each portable unit. Each portable unit includes a read-in device capable of establishing a short-range communication link with the read-out device of each electronic shelf label for reading in the product identification and for recording same in the record memory for the respective portable unit.

20 Claims, 10 Drawing Sheets

CHECKOUT PROCEDURE

PRODUCT MONITORING SYSTEM PARTICULARLY USEFUL IN MERCHANDISING AND INVENTORY CONTROL

FIELD AND BACKGROUND OF THE INVENTION

The present invention relates to a product monitoring system for monitoring, or keeping track of, various types of products. The invention is particularly useful in merchandising of products and also in inventory control of products, and is therefore described below particularly with respect to such applications.

In the common retail store, consumers remove products from the shelves, place them in their shopping carts, and present them at a point of sale (POS) for identification, price calculation and payment. To identify each purchased product, the products are usually labeled with a universal product code (UPC, or "bar-code") readable by a scanner connected to the POS. Scanning is done by a cashier holding each product to expose its UPC to the scanner. The labor cost and the line waiting time in such systems have prompted the introduction of a commercial self-scanning system, wherein the shopper uses a handheld scanner to scan the UPC of each item placed in his shopping cart. The handheld scanner includes a display, a copy of the updated price database, and a calculating unit, enabling the shopper to update the information regarding the cart's contents. Items whose UPC cannot be read by the scanner (which is quite common) are presented at the POS for re-scanning. Random re-scanning of the entire cart contents deter shoppers from dishonest behavior. Examples of handheld scanners for use by consumers are described in U.S. Pat. Nos. 5,457,307 and 5,382,779, 5,361,871, or 5,345,071.

Also known are electronic shelf label systems, in which the store's central computer downloads price information to electronic shelf labels placed near merchandise items. Examples of such systems are described in U.S. Pat. Nos. 4,002,886, 4,139,149, 4,521,677, 4,766,295, 5,019,811 and 5,313,569.

Also known are systems for counting items displayed on the shelves, as part of routine inventory control or order management, in which a handheld portable unit is used to either scan or key-in the product's code and then key-in count information. Such information is downloaded later into the store computer through a terminal at the store office.

OBJECT AND BRIEF SUMMARY OF THE INVENTION

The main object of the present invention is to provide a product monitoring system which may be adapted for any of the above applications and which is more dependable and less expensive, which utilizes a portable unit easier to carry than a handheld scanner, and which is more accurate and more convenient than manual keying-in of the product's code.

According to a broad aspect of the present invention, there is provided a product monitoring system for monitoring a variety of products grouped according to their identities on shelves, comprising: a central computer having storage means for storing the identification of each group of products on the shelves; a plurality of electronic shelf labels, each located adjacent to a shelf for a group of products, each of the electronic shelf labels including communication means for communicating with the central computer, storage means for storing the identification of the respective group of products, display for displaying the information relating to the respective group of products, and a read-out device for reading out the identification of the respective group of products as communicated to it from the central computer via the first communication link; a plurality of portable units each to be carried by a user of the system; and a record memory for each of the portable units; each of the portable units including a read-in device capable of communicating via a second, separate short-range communication link with the read-out device of each of the electronic shelf labels for reading in the product identification and for recording same in the record memory for the respective portable unit.

A number of embodiments are described below for purposes of example.

According to further features in one preferred embodiment described below particularly useful in a retail store, the storage means of the central computer also stores price information for each group of identical products which price information is communicated to the electronic shelf labels via the first communication link. In addition, in each of the electronic shelf labels, the storage means also stores price information regarding the products on the respective shelf, the display is a changeable display which also displays the price information, and the read-out device also reads out the price information. Preferably, in each of the portable units, the read-in device also reads in the price information via the second communication link, and records same in the record memory for the respective portable unit.

According to further features in the described preferred embodiments, each of the portable units also records, in the record memory for the respective portable unit, the total quantity of products for each product identification read into the record memory for the respective portable unit. The latter feature is particularly useful in a retail store system, but may also be useful in an inventory control or order management system, as will be described more particularly below.

According to further features in the described preferred embodiments, the record memories and displays are in their respective portable units. However, other embodiments are described in which the portable units are considerably simplified by including the record memories in the central computer, and/or the displays in the shelf labels.

DESCRIPTION OF THE PREFERRED EMBODIMENTS

Figure 1:
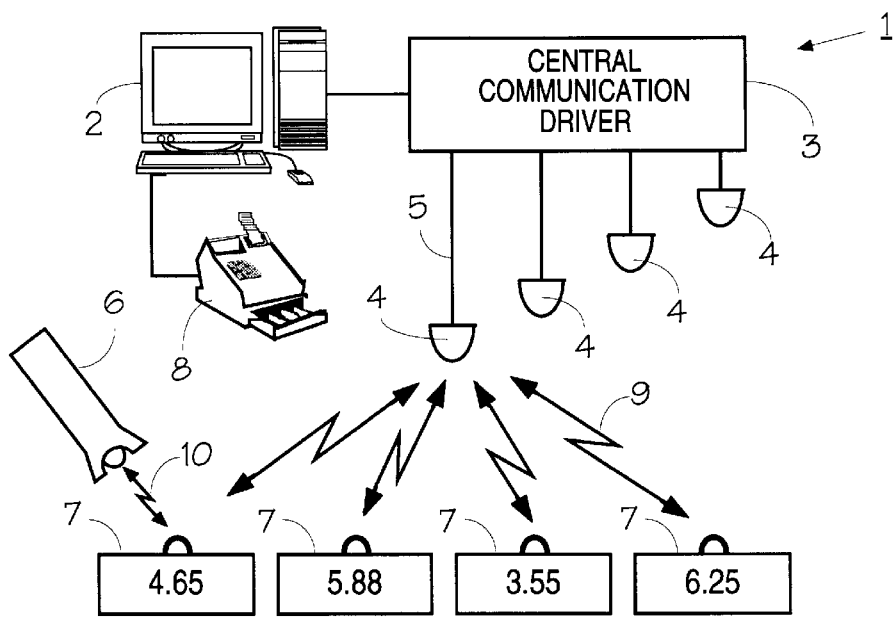
FIG. 1 is a block diagram of a preferred embodiment of the present invention.

FIG. 1 illustrates the layout of a preferred system 1 as may be used in a retail store for displaying and selling products grouped according to their identities on a plurality of shelves. The system includes a central computer 2 having storage means which stores the product identifications and prices, and downloads the prices to a plurality of electronic shelf labels 7 and a number of POS (points of sale) 8. A first, store-wide communication link between the central computer 2 and the electronic shelf labels 7 includes a central communication driver 3 connected by wires 5 to ceiling transceivers 4, which communicate with the electronic shelf labels 7 through infrared links 9. A plurality of portable units 6 communicate with the electronic shelf labels 7, each via a second, separate, short-range communication link 10 which allows selective communication with a single electronic shelf label at a time. Each portable unit 6 can also communicate with compatible communication ports of POS 8 and central computer 2 via additional communication links (not shown).

Figure 2:
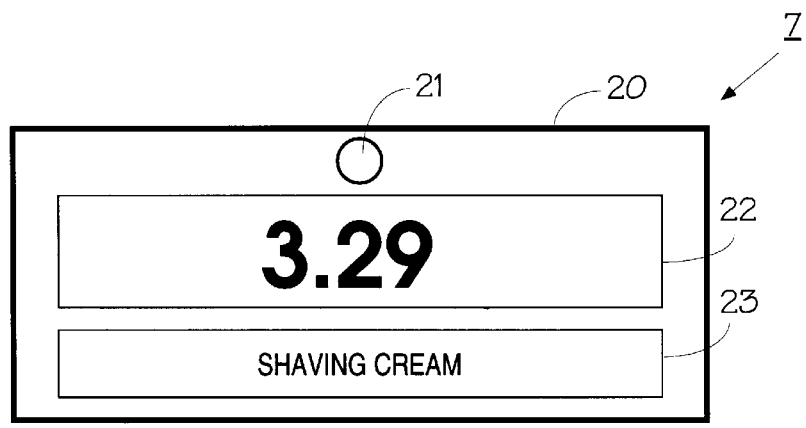
FIG. 2 is a schematic illustration of an electronic shelf label included in the present invention.

FIG. 2 illustrates schematically the visible elements of an electronic shelf label 7, including a frame 20, an infrared communication port 21 constituting a read-out device, a changeable display screen 22, and an printed (or electronic) label 23 identifying the associated merchandise item.

The electronic shelf label 7 may also include an electronic scale (not shown) for weighing and determining the price of products (e.g., fruits) displayed in bulk and sold according to weight. Such an electronic scale would receive the product price list via infrared link 9, would display the calculated price for the weighed quantity, and would communicate with the portable units 6 in the same manner as the other electronic shelf labels.

Figure 3A:
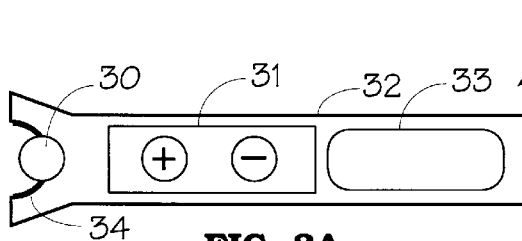
FIGS. 3A–3C are schematic illustrations of three versions of the portable unit included in the present invention.

FIG. 3A illustrates a preferred embodiment 6A of the portable unit 6. It includes a read-in device in the form of an infrared receiver 30 used to communicate with the electronic shelf labels 7, central computer 2, and POS 8. It further includes a housing 32 and a two-button keypad 31 constituted of a "+" button to be depressed when a product ID is to be added into the record memory of the respective portable unit, and a "−" button to be depressed when a product ID is to be subtracted from the record memory of the portable unit, e.g., when the customer returns a previously selected product from the cart back to the shelf. A display screen 33 shows purchase information, such as the item price, quantity, and the subtotal of all items already selected (see FIG. 7). A reflective surface 34 focuses the infrared transmission to limit communication only to a single selected label, POS, or computer.

Figure 3B:
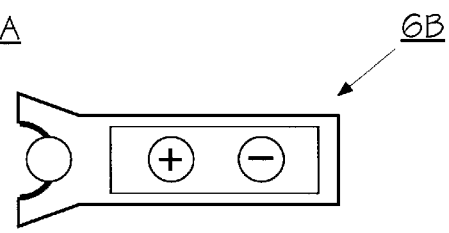

FIG. 3B shows a portable unit 6B similar to that of FIG. 3A, but the screen is omitted. In this case, the purchase information is communicated to a selected electronic shelf label, and is displayed thereon. The screen 22 (FIG. 2) of the electronic shelf label would then he expanded to display thereon the purchase information along with the normal price information.

Figure 3C:
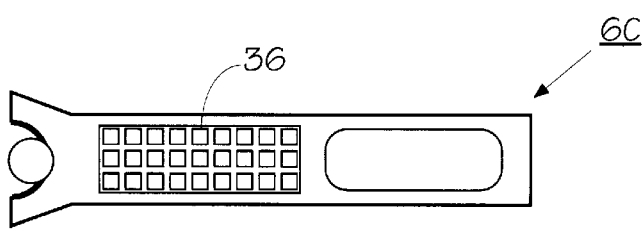

FIG. 3C shows a portable unit 6C similar to that of FIG. 3A, but the two-button keypad 31 is replaced with an alphanumeric keypad 36, to allow recording specific quantities of the products, e.g., during inventory count or order preparation.

Figure 4A:
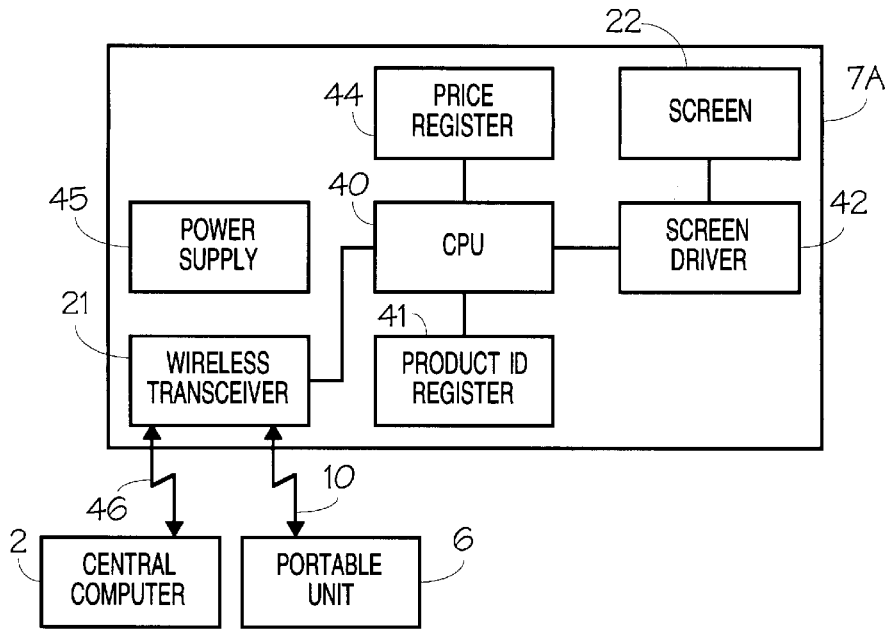
FIGS. 4A and 4B are block diagrams of two versions of the electronic shelf labels included in the present invention.

FIG. 4A is a schematic block diagram of one preferred embodiment of electronic shelf label 7A. It includes a storage device in the form of a product ID register 41 for storing its identity, another storage device in the form of a price register 44 for storing price information, and a wireless transceiver 21 which communicates via store-wide communication link 46 with central computer 2 to receive therefrom price information addressed to each label according to its product ID register 41 and stored in price register 44. Wireless transceiver 21 also communicates via short-range communication link 10 with the portable units 6, to upload thereto the product ID according to the product ID register 41 and the product price according to the price register 44. Product ID register 41 stores a code identifying the product. The code can be its UPC or any other code recognized by central computer 2. The product ID may be stored in register 41 manually in a label initiation procedure, or via the central computer, as known in the prior art relating to electronic shelf labels. Screen driver 42 controls the display of the contents of price register 44. CPU 40 controls the information flow among the various units, and power supply 45 (e.g., a battery) energizes the electronic shelf label.

Figure 4B:
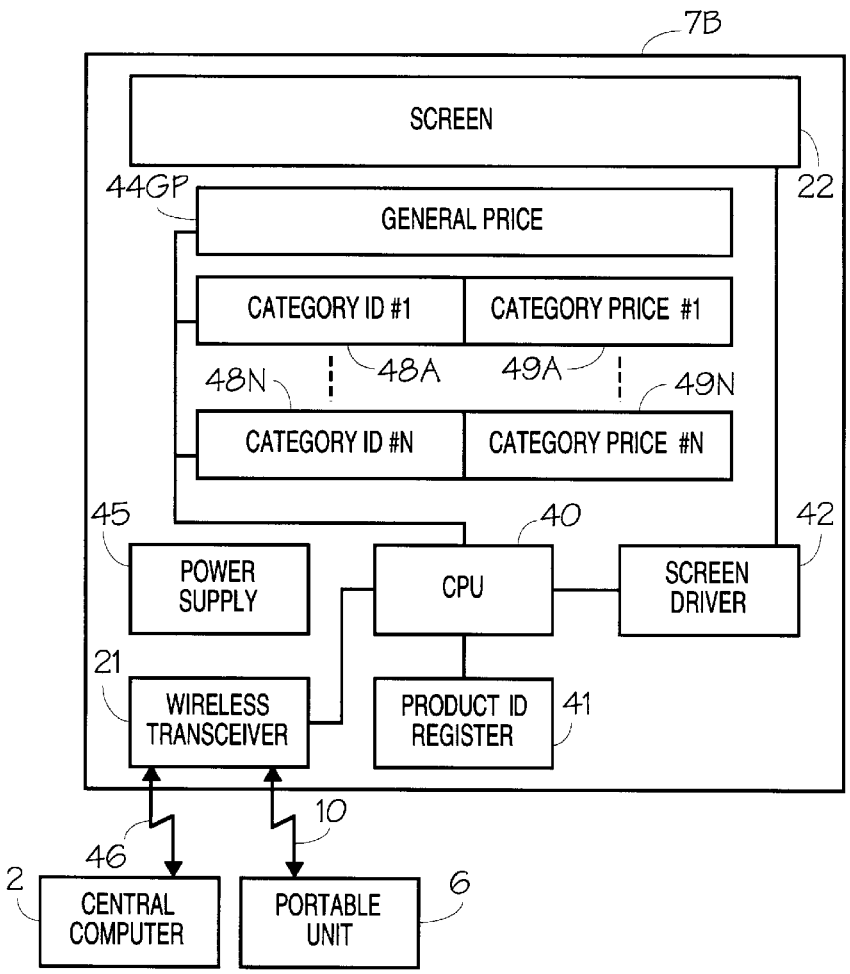

FIG. 4B illustrates an electronic shelf label 7B according to that drescribed in a co-pending PCT Patent Application No. PCT/US96/04848 but modified according to the present invention. Thus, for each merchandise item there is a general price 44GP representing the price to the general public, and also privileged prices according to a number of privileged categories A–N. Each category is assigned a category ID register 48A–48N containing the category ID, and a corresponding category price register 49A–49N, containing the price of the respective product for a member of the respective category. It will be appreciated that if the category ID is to be identified simply by its serial number in the range A–N, then the category ID registers 48A–48N become redundant and can be omitted.

The contents of registers 44GP, 48A–48N and 49A–49N are determined by messages transmitted from central computer 2, which are received in wireless transceiver 21 and addressed according to the contents of product ID register 41. Screen 22 normally displays the contents of register 44GP; however, if a signal received from a portable unit 6 contains the contents of any of the registers 48A–48N, the first matching category ID causes CPU 40 to instruct screen driver 42 to display on screen 22 the contents of the corresponding register of 49A–49N, and to keep this message as long as the signal is received, and preferably also for a short predetermined delay afterwards. Each portable unit identifies its respective category, and when a portable unit 6 requests price information, the information uploaded from the electronic shelf label 7B is the contents of the register 49A–49N which corresponds to the category ID of the portable unit.

Figures 5, 6A, 6B:
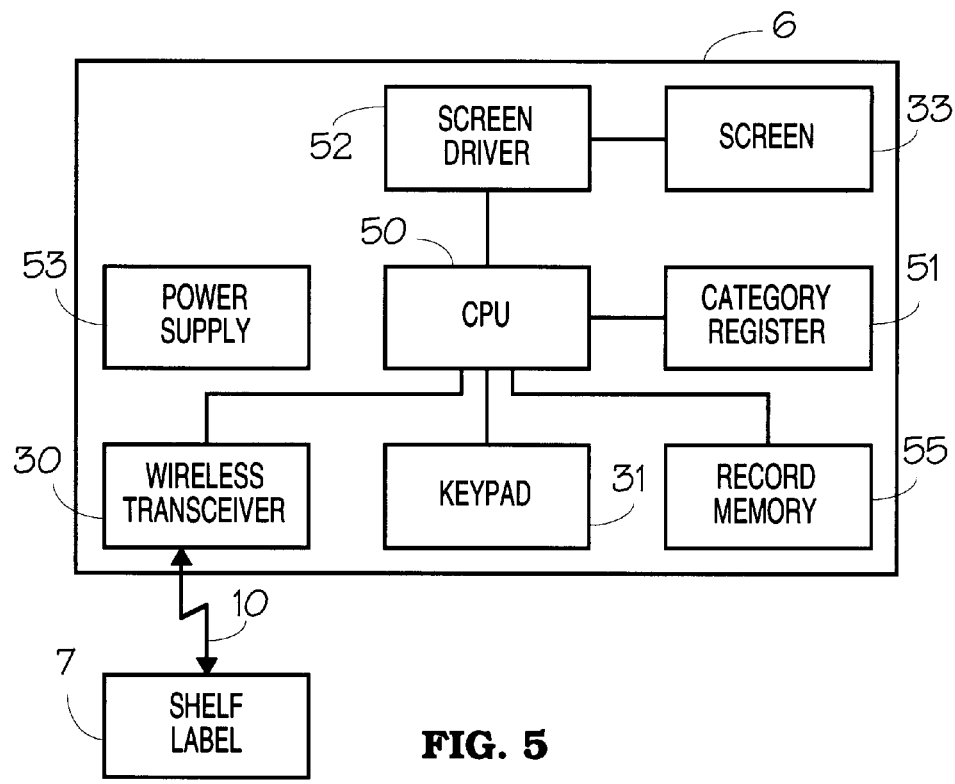
FIG. 5 is a block diagram of the portable unit according to the present invention.
FIG. 6A is a table illustrating by example the contents of the record memory of the portable unit used to record a purchase according to the present invention.
FIG. 6B is a table illustrating by example the contents of the record memory of the portable unit used to record an inventory count according to the present invention.

FIG. 5 is a block diagram of portable unit 6 as illustrated in FIGS. 3A–3C. The unit is activated by pressing any button on keypad 31 when it is desired to communicate, via short-range communication link 10 from its wireless transceiver 30, with an adjacent unit, which can be a shelf label 7, a POS 8, or the central computer 2. If such communication is successful, portable unit 6 exchanges information with the adjacent unit according to the procedure described below. A record memory 55 stores the product ID and the product price as received from the shelf label, and the count and/or order information as keyed-in through keypad 31. If the system is of the multi-price type as illustrated in FIG. 4B, a category register 51 is provided identifying the category of the privileged customers eligible to receive special prices. Its contents are either fixed if the portable unit is personal to the customer, or uploaded thereto at a check-in point via communication with central computer 2 upon presenting appropriate documents confirming the customer's privileged category. Screen driver 42 controls the display of quantity and price information on screen 33. CPU 50 controls all operations of the unit, while power supply 53 energizes the unit.

FIG. 6A is an example of the contents of category register 51 of FIG. 5. Each item purchased is stored with its code and price as received from the corresponding electronic shelf label 7, and with its quantity as keyed-in through keypad 31.

FIG. 6B is an example of the contents of category register 51 of a portable unit 6 serving personnel to count or order inventory items. The product ID code is received from the respective electronic shelf label 7, and the count is keyed-in through keypad 31.

Figure 7:
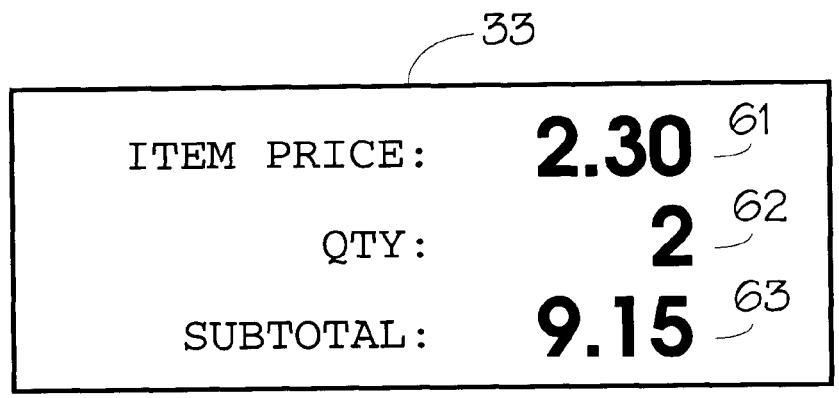
FIG. 7 is a schematic illustration of a display included in the portable unit according to the present invention.

FIG. 7 illustrates screen 33 of a portable unit 6 relating to a purchase represented by FIG. 6A. The consumer can read the price 61, its quantity 62, and the subtotal 63 of the entire purchase so far as calculated by CPU 50 from the contents of record memory 55 according to FIG. 6A. Price 61 can be a privileged price in accordance with the contents of category register 51. Display 33 may be eliminated (FIG. 3B) by having the portable unit 7 communicate with electronic shelf label 7 to display the information of the FIG. 7.

Figure 8:
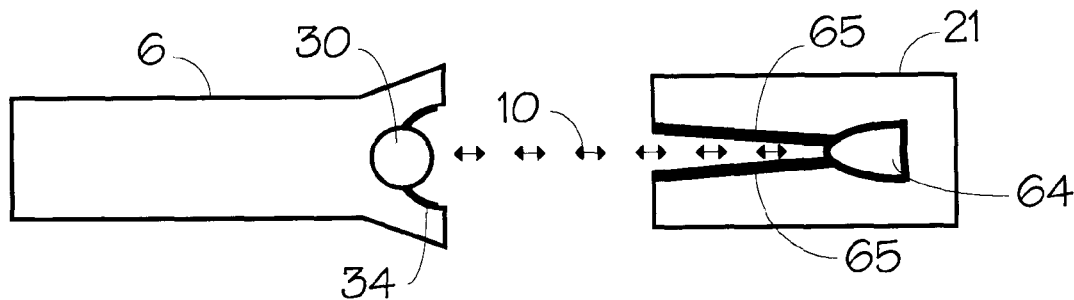
FIG. 8 is a schematic illustration of a construction of transceiver of the electronic shelf label aimed at restricting signal reception to a specific portable unit.

FIG. 8 is a schematic illustration from the top of the short-range communication link 10 enabling the portable unit 6 to communicate with only a single adjacent unit (electronic shelf label, POS or central computer) at one time. Reflector 34 limits the infrared signal to a narrow beam pointing at the infrared transceiver 21 of the electronic shelf label (or POS, or central computer). Infrared transceiver 21 includes an infrared emitter and infrared sensor, both represented at 64, having a very narrow field of view limited by non-reflective surfaces 65. On the other hand, as emitter/sensor 64 serves also to communicate with ceiling transceivers 4 (FIG. 1), it has a wide-angle exposure from the top view. It will be appreciated that other solutions for short range communication (outputting a very weak signal from portable unit 6 effective for only a few centimeters of range or requiring physical contact between the portable unit and the adjacent unit) are also satisfactory for providing selective short range communication.

Figure 9:
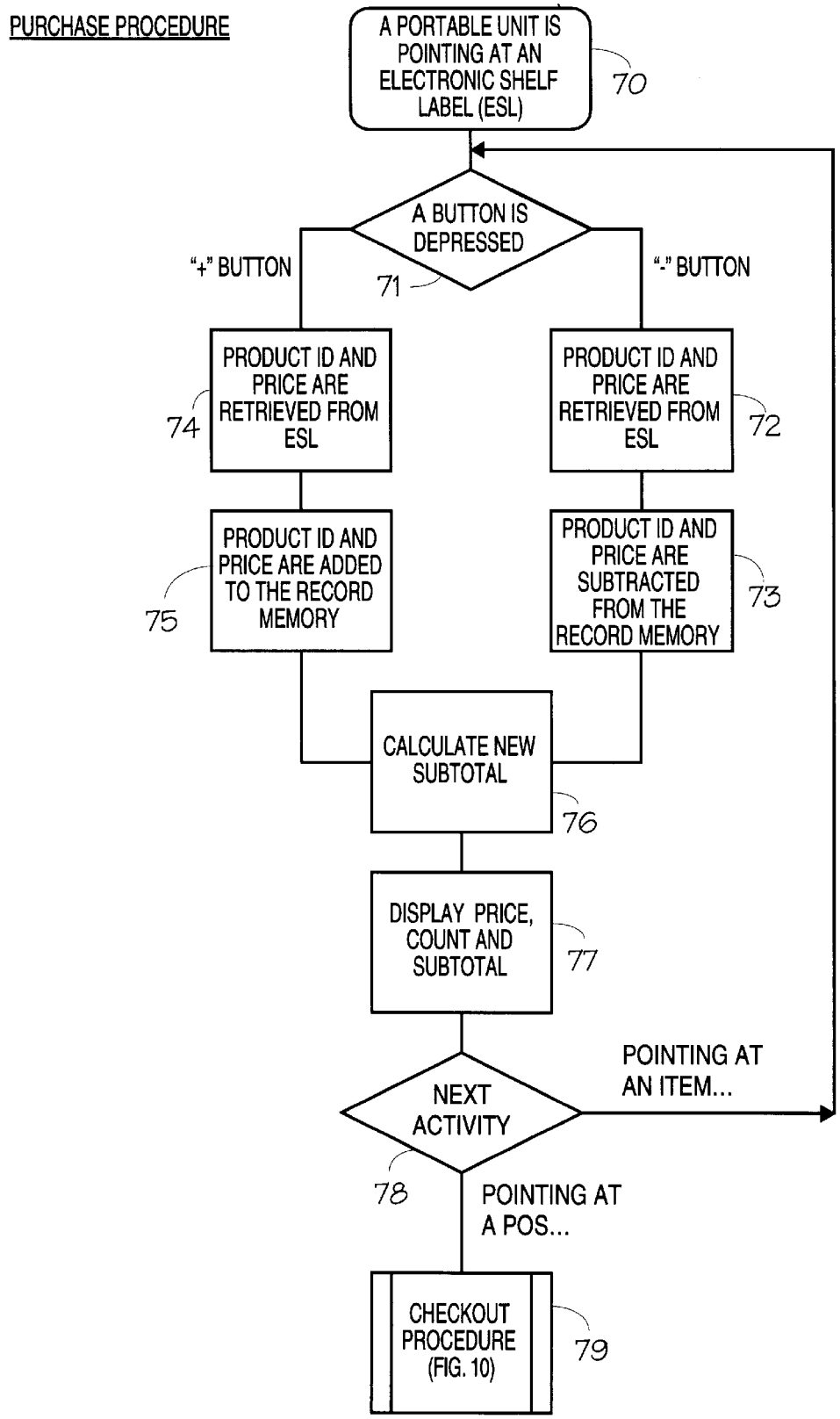
FIG. 9 is a flowchart of a purchase procedure according to a preferred embodiment of the present invention.

FIG. 9 is a flowchart of the purchase procedure according to a preferred embodiment of the present invention. A consumer points a portable unit, preferably of FIG. 3A, at an electronic shelf label (block 70), and depresses either the "+" or "−" button (block 71). The portable unit then sends a non-addressed interrogating signal to the electronic shelf label for selectively activating the read-out device of the electronic shelf label at which the portable unit is pointed, causing that read-out device to respond by transmitting a signal from the electronic shelf label containing the product ID and its price (block 72 or block 74). If a single price system is employed in the store (FIG. 4A), then the price retrieved from the electronic shelf label is the same for all customers. However, if a multiple-pricing system is employed (FIG. 4B) and the consumer is eligible for a privileged price as evidenced by the contents of category register 51 of FIG. 5, then the interrogating signal contains category information, and the response signal contains price information respective to the consumer category.

After retrieving the product ID and price information, the product is either added to (block 75) or subtracted from (block 73) the record memory (block 55 of FIG. 5, and FIG. 6A). Then the subtotal is calculated (block 76), and is displayed along with the item count and price (block 77 and FIG. 7). The consumer may now choose to point the portable unit at an electronic shelf label (block 78), of the same or another item, or to approcach a point of sale for concluding the purchase (block 79).

Figure 10:
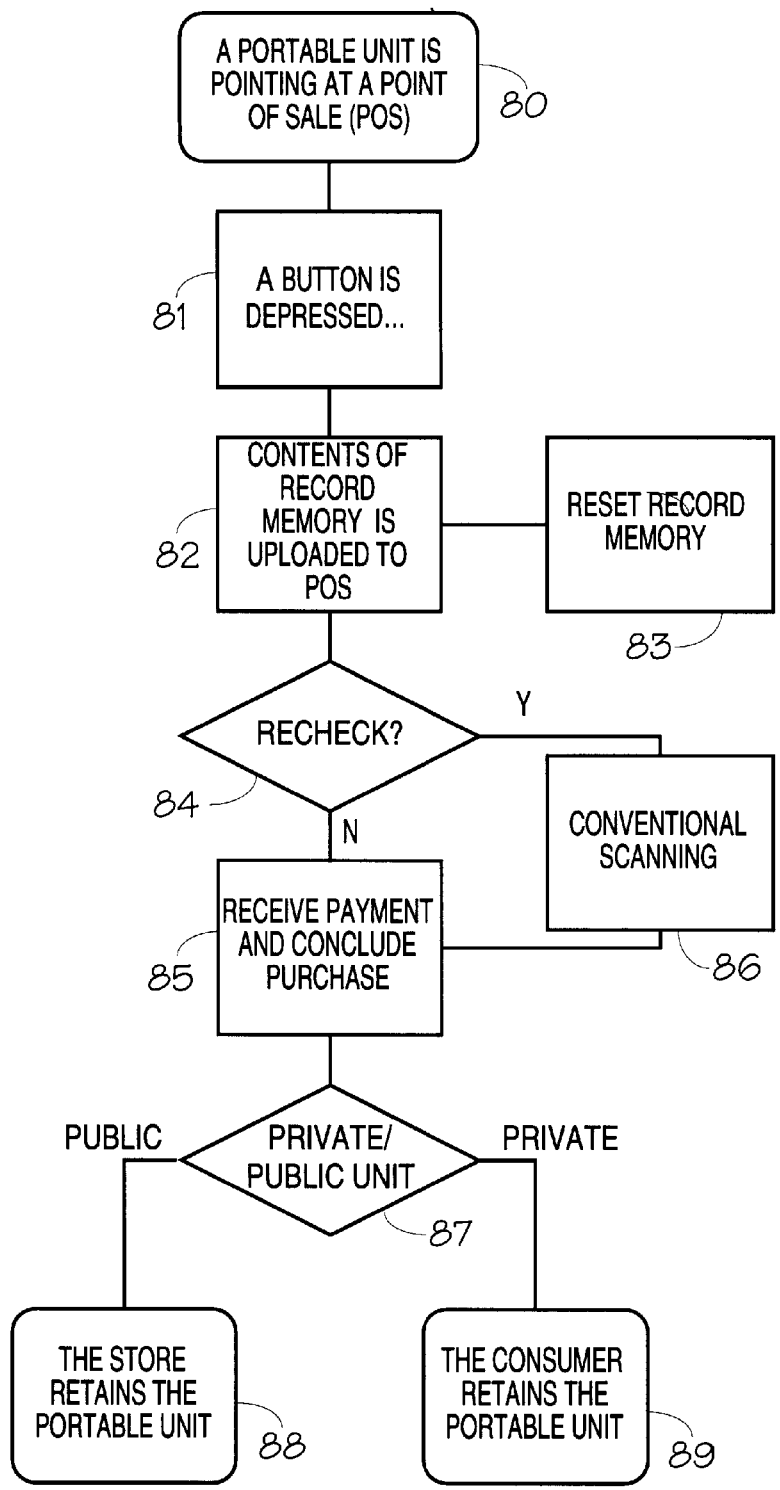
FIG. 10 is a flowchart of a checkout procedure according to a preferred embodiment of the present invention.

FIG. 10 is a flowchart of the checkout procedure according to a preferred embodiment of the invention. The consumer, after completing the purchase according to FIG. 9, points the portable unit at a POS (block 80) and presses any button (block 81). This causes the portable unit to communicate with the POS and upload thereto the contents of the purchase memory and, if appropriate, the category ID (block 82). The contents of the record memory are then erased (block 83) for preparing it for the next purchase. For security considerations, a decisions may then be made randomly by the point of sale (block 84) whether the contents of the shopping card wil be subject to re-scanning (block 86).

The purchase is then concluded conventionally in block 85 by issuing a receipt and receiving payment, according to the contents of the record memory received from the portable unit (block 82) or the re-scanning, if such has been selected at block 84. If the portable unit is personal, it is retained by the customer (block 89). If the portable unit has been received at the store entrance, it is retained at the store (block 88), e.g., handed to the cashier at the point of sale.

Figure 11:
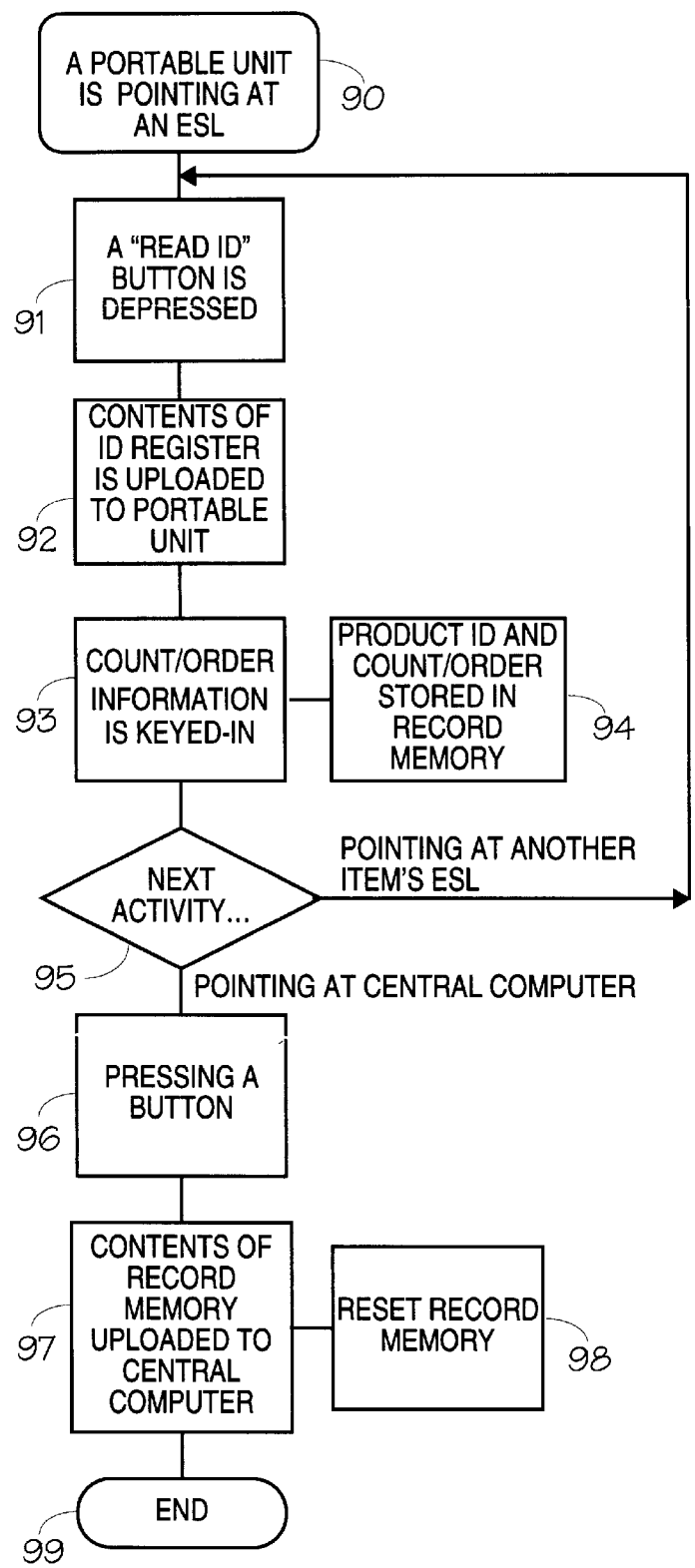
FIG. 11 is a flowchart of an inventory count/order procedure according to a preferred embodiment of the present invention.

FIG. 11 is a flowchart of an inventory count/order procedure made by store personnel using the system of the present invention. The merchant points the portable unit, preferably of FIG. 4C, to the electronic shelf label (ESL) for a selected merchandise item (block 90). Upon pressing a button (block 91) the portable unit communicates with the electronic shelf label and receives the item ID therefrom (block 92). The merchant then keys-in count or order information through keypad 36 of FIG. 3C (block 93). This is recorded, along with the respective product ID, in record memory 55 of FIG. 5 (block 94). The merchant then chooses (block 94) between moving to the next inventory item (returning to block 91) or approaching the central computer for uploading thereto the inventory count and/or order (blocks 96–99).

As one variation, particularly useful for on-line inventory count or order, the record memory (block 55 of FIG. 5) for at least some of portable units may be embodied in the central computer 2 rather than in the portable unit 6 (FIG. 1). In this case, portable unit 6 communicates the product ID uploaded from the electronic shelf label 7 and the keyed-in count or order information to the record memory within central computer 2 via ceiling transceivers 4, wires 5 and central communication driver 3. The portable unit's transceiver 30 (FIG. 3A) should be pointed towards the ceiling transceiver 4 to enable communication.

Figure 12:
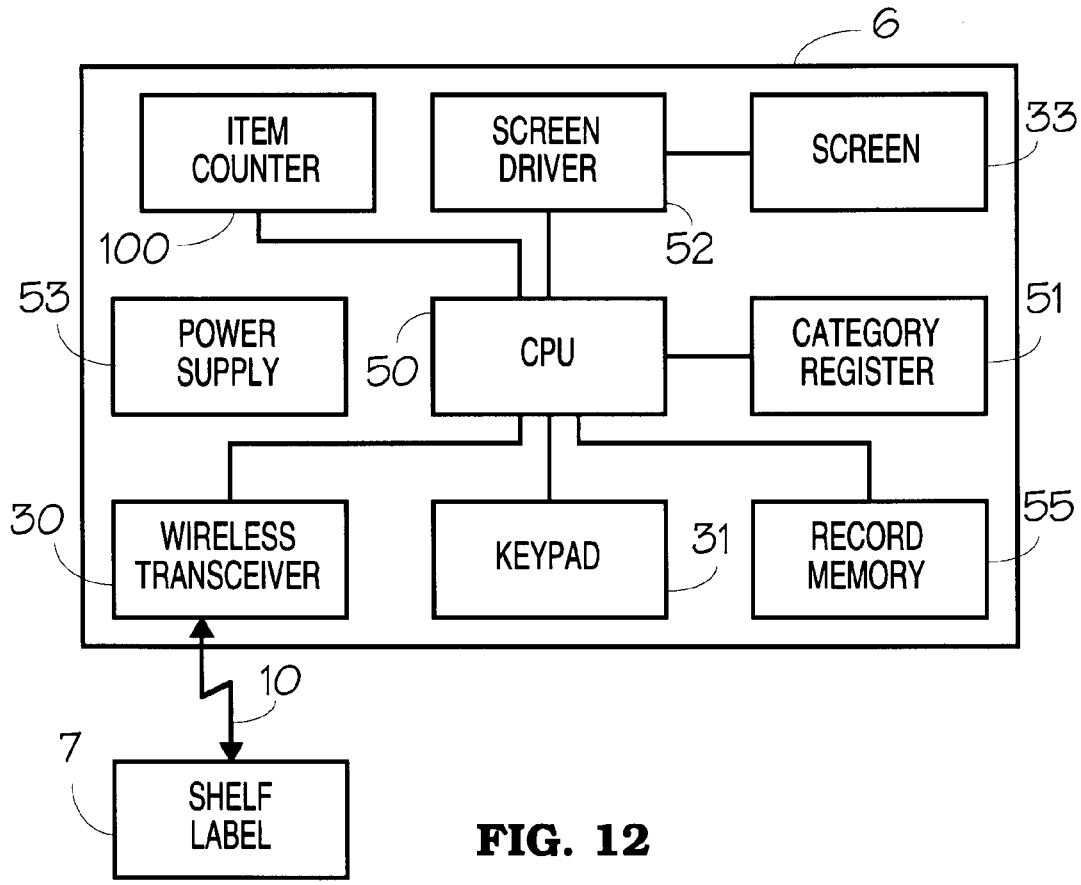
FIG. 12 illustrates a modification in the construction of each portable unit to include an item counter for keeping track of the number of items purchased.
Figure 13:
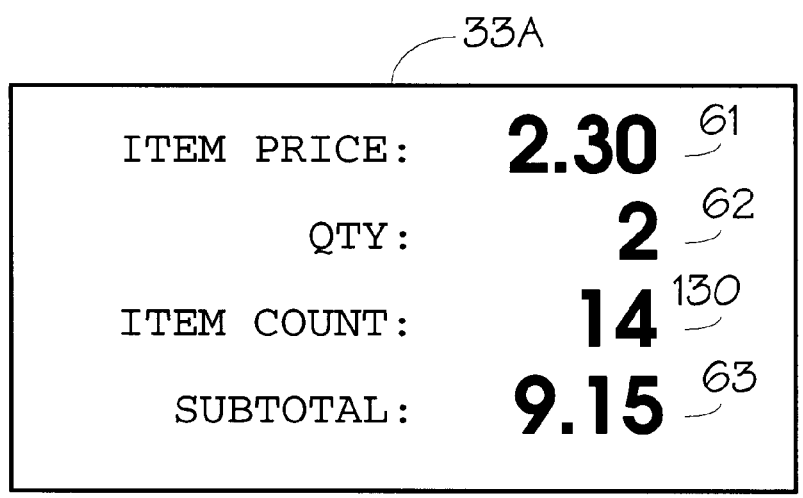
FIG. 13 illustrates the display of the portable unit to display the contents of the item counter.
Figure 14:
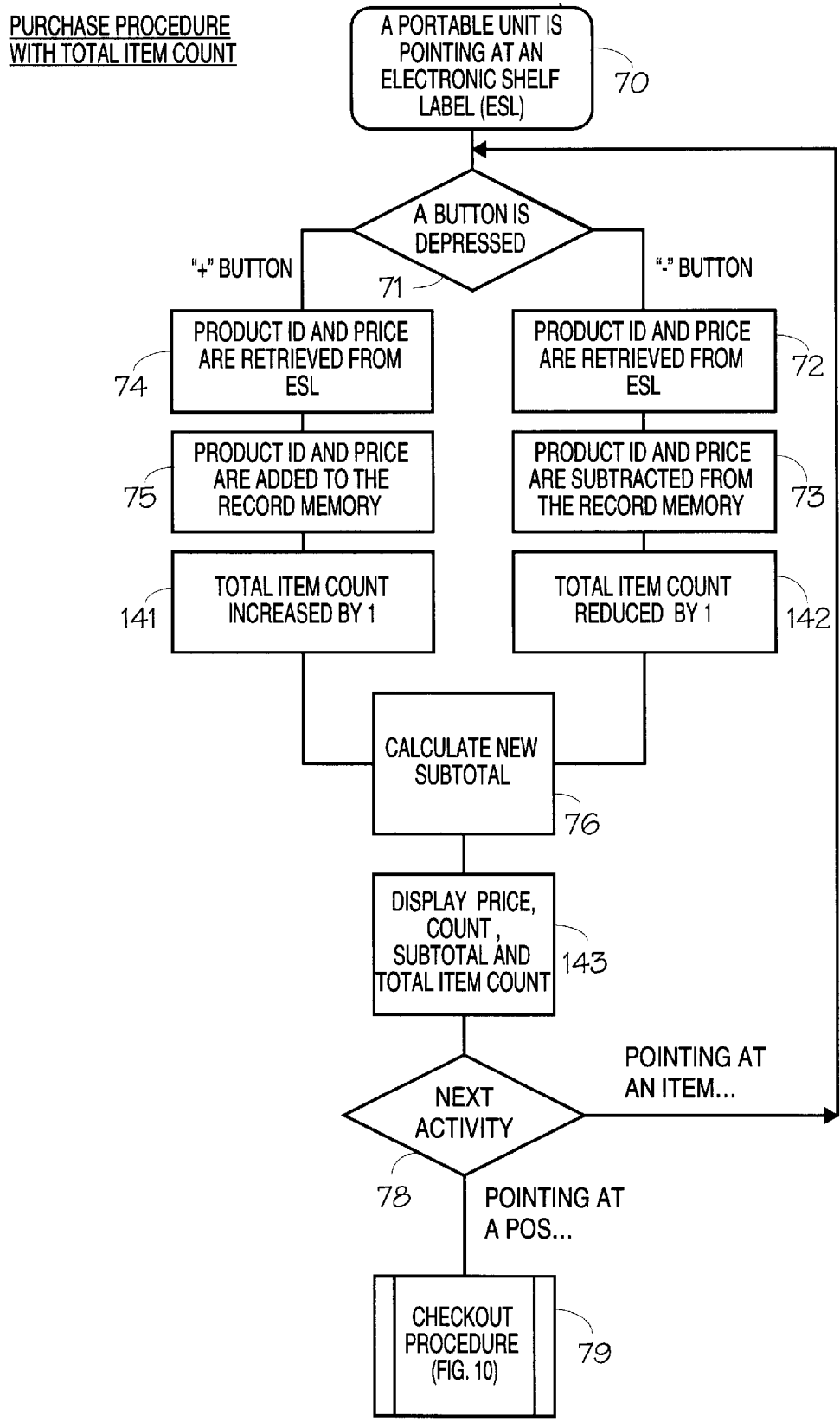
FIG. 14 is a flowchart, corresponding to that of FIG. 9, but illustrating the operation of the item counter with each depression of the "+" button or "−" button in the respective portable unit.

FIGS. 12, 13 and 14 correspond to FIGS. 5, 7 and 9, respectively, but illustrate the inclusion of an item counter, generally designated 100, which is incremented one count by each depression of the "+" button (block 141, FIG. 14), and decremented one count by each depression of the "−" button (block 142, FIG. 14), in the respective portable unit. Thus, the contents of the counter will continuously display the total number of items that have been selected by the consumer. This enables the consumer at any time to make a quick check to see whether all the items placed in the consumer's shopping cart have been entered into the portable unit. The provision of such an item counter also enables the checker to make a quick check to see whether all the items selected by the consumer have indeed been entered into the consumer's portable unit.

Figure 15:
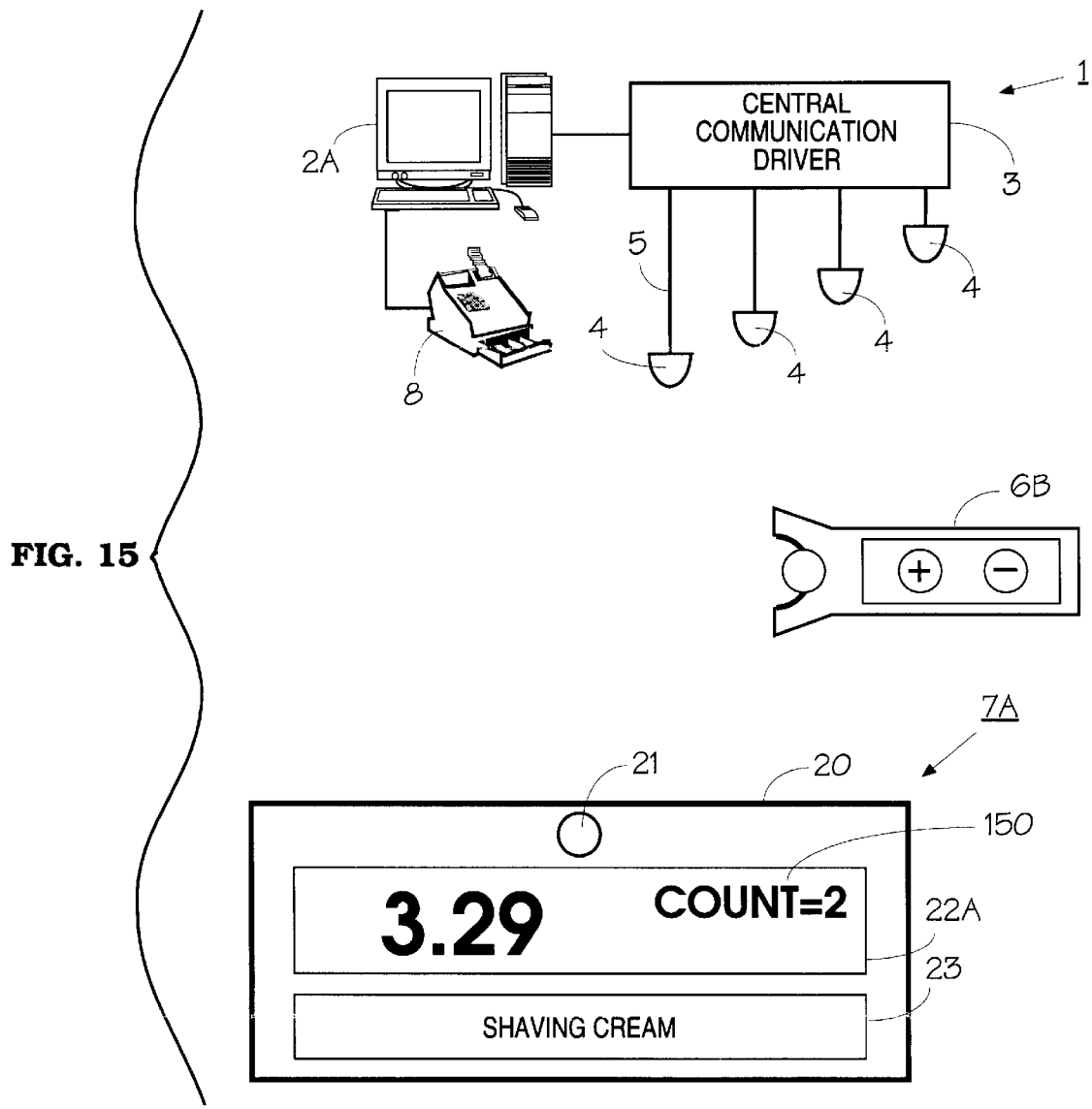
FIG. 15 illustrates another system n which the portable units are substantially simplified by including the record memories in the central computer, and/or the displays in the shelf labels.

FIG. 15 illustrates a system including a further variation which may be used in order to simplify the construction of the portable units, by including the record memories in the central computer 2A, and/or the displays in the electronic shelf label 7A. The system illustrated in FIG. 15 otherwise is constructed and operates in the same manner as described above.

Another possible application of the invention is for shelf-space management or inventory control in a store environment. The electronic shelf labels may be used to temporarily display information that is relevant for store personnel (e.g., sales performance, quantity in stock, etc.). The store personnel can then walk through the store with a portable unit that is used to read the product ID from the label and then key in a decision regarding that product (e.g., order more of that product, take the product off the shelves, or increase the product's shelf space). The product ID together with the decision information is sent to the central computer where it is logged, reported and acted upon.

As a further variation, the electronic shelf label may include an attention catching device, such as a blinking light, which is turned on if more immediate attention from the store personnel is required. After the decision regarding that electronic shelf label is made and transmitted to the central computer, the central computer turns off the attention catching device for that product.

A still further application of this invention may be for product picking in a warehouse environment. In this case, the electronic shelf labels display the number of products to be picked. Upon picking a quantity of the product, the person who does the picking will use the portable unit to read the product ID and then to key in the number of products picked. This information will be transmitted to central computer 2 via ceiling transceivers 4, wires 5 and central communication driver 3. Upon receiving the information, the central computer will transmit to the appropriate electronic shelf label a command via the same communication infrastructure to turn off its display so that the picker (or another picker) will not mistakenly pick that product again.

The short-range communication link is used to query the ID information and other data from the electronic shelf label. One possible implementation for such a link is to transmit a signal which is not addressed to any particular label, but which is directionally confined to be received by only one label, the receiving label replying with its ID and the additional requested information. Another possible implementation is to transmit the signal such that several labels receive it, but physically limit the reception of the response signal from the labels so that it is received by the portable unit from just one label. This short range link can be implemented in several technologies, for example radio frequency, ultrasound and infrared. Infrared is the most applicable technology because of the relative ease of limiting the range and angle of short range transmission with infrared.

While the invention has been described with respect to several preferred embodiments, it will be appreciated that these are set forth merely for purposes of example, and that many other variations, modifications and applications of the invention may be made.

What is claimed is:

1. A product monitoring system for monitoring a variety of products grouped according to their identities on shelves, comprising:

a central computer having storage means for storing the identification of each group of products on the shelves;

a plurality of electronic shelf labels, each located adjacent to a shelf for a group of products, each of said electronic shelf labels including communication means for communicating with said central computer via a first communication link between the central computer and the electronic shelf labels, storage means for storing the identification of the respective group of products, an electrically changeable display for displaying information relating to the respective group of products as communicated to it from said central computer via said first communication link, and an activatable read-out device for reading out, when activated, the product identification and price information of the respective group of products;

a plurality of portable units each to be carried by a user of the system;

and a record memory for each of said portable units;

each of said portable units including a read-in device capable of communicating via a second, separate short-range communication link with the readout device of each of said electronic shelf labels for reading in the product identification and for recording same in the record memory for the respective portable unit.

2. The system according to claim 1, wherein said storage means of the central computer also stores price information for each group of identical products which price information is communicated to the electronic shelf labels via said first communication link;

and wherein, in each of said electronic shelf labels, said storage means also stores price information regarding the products on the respective shelf, said display being a changeable display which also displays said price information, and said read-out device also reads out said price information.

3. The system according to claim 2, wherein, in each of said portable units, said read-in device also reads in said price information via said second communication link, and records same in the record memory for the respective portable unit.

4. The system according to claim 3, wherein the price information stored in the storage means of said central computer, and in the storage means of said electronic shelf labels, includes different prices for different consumer categories; and wherein each portable unit further includes a category identification to identify the category of the respective user and thereby the price to be read into the respective portable unit.

5. The system according to claim 3, wherein the system includes a number of points of sale units each including a record memory, and means for communicating via said second communication link with said portable units to load, under control of the portable units, the contents of the record memory for the respective portable unit.

6. The system according to claim 3, wherein each of said portable units also records in the record memory for the respective portable unit the total quantity of products for each product identification read into the record memory for the respective portable unit.

7. The system according to claim 6, wherein each of portable units also includes calculating means for calculating the total price of the items stored in the record memory for the respective portable unit.

8. The system according to claim 7, wherein each portable unit also includes a display for displaying the current item count and the current purchase subtotal during a purchase.

9. The system according to claim 1, wherein each of said portable units also records in the record memory for the respective portable unit the total quantity of products for each product identification read into the record memory for the respective portable unit.

10. The system according to claim 9, wherein said system further includes a further communication link between each portable unit and said central computer enabling each portable unit to load into the storage means of the central computer the total quantity of products for each product identification read into the record memory for the respective portable unit.

11. The system according to claim 1, wherein said first communication link is an infra-red link between an infra-red transmitter at a fixed location, and an infra-red receiver carried by each of said electronic shelf labels.

12. The system according to claim 11, wherein said second communication link is also an infra-red link between the read-in devices of the portable unit and the read-out devices of the electronic shelf labels.

13. The system according to claim 1, wherein said record memories are located in their respective portable units.

14. The system according to claim 1, wherein said record memories for all the portable units are located in said central computer.

15. A product monitoring system for monitoring a variety of products grouped according to their identities on shelves, comprising:

a central computer having storage means for storing the identification of each group of products on the shelves and price information for each group of identical products;

a plurality of electronic shelf labels, each located adjacent to a shelf for a group of products, each of said electronic shelf labels including communication means for communicating with said central computer via a first communication link between the central computer and the electronic shelf labels, storage means for storing the identification of the respective group of products and price information regarding the products on the respective shelf, an electrically changeable display for displaying price information relating to the respective group of products as communicated to it from said central computer via said first communication link, and an activatable read-out device for reading out, when activated, the product identification and price information of the respective group of products;

a plurality of portable units each to be carried by a user of the system;

and a record memory for each of said portable units;

each of said portable units including a read-in device capable of communicating via a second, separate short-range communication link with the read-out device of each of said electronic shelf labels for selectively activating the read-out devices to read-out the product identification and price information of the respective group of products; for reading in the product identification and price information via said second communication link; and for recording same in the record memory for the respective portable unit.

16. The system according to claim 15, wherein the price information stored in the storage means of said central computer, and in the storage means of said electronic shelf labels, includes different prices for different consumer categories; and wherein each portable unit further includes a category identification to identify the category of the respective user and thereby the price to be read into the respective portable unit.

17. The system according to claim 15, wherein the system includes a number of points of sale units each including a record memory, and means for communicating via said second communication link with said portable units to load, under control of the portable units, the contents of the record memory for the respective portable unit.

18. The system according to claim 15, wherein each of said portable units also records in the record memory for the respective portable unit the total quantity of products for each product identification read into the record memory for the respective portable unit.

19. The system according to claim 15, wherein each portable unit further includes a "+" button to be depressed when a product identification is to be added into the record memory for the respective portable unit, and a "−" to be depressed when a product identification is to be subtracted from the record memory for the respective portable unit.

20. The system according to claim 15, wherein said record memory for each portable unit includes an item counter which is incremented one count for each product to be added into the record memory for the respective portable unit, and is decremented one count for each product to be subtracted from the record memory for the respective portable unit.

* * * * *

UNITED STATES PATENT AND TRADEMARK OFFICE
CERTIFICATE OF CORRECTION

PATENT NO. : 6,105,004
DATED : August 15, 2000
INVENTOR(S) : AVNER HALPERIN, et al.

It is certified that error appears in the above-identified patent and that said Letter Patent is hereby corrected as shown below:

On the Title page:

below Section [22], insert:

-- [30] Foreign Application Priority Data

April 18, 1996   Israel   117952--

Signed and Sealed this

Twenty-fourth Day of April, 2001

Attest:

NICHOLAS P. GODICI

*Attesting Officer*   *Acting Director of the United States Patent and Trademark Office*